US011823300B2

(12) United States Patent
Piramanayagam et al.

(10) Patent No.: US 11,823,300 B2
(45) Date of Patent: Nov. 21, 2023

(54) AIRCRAFT PASSENGER COMPLIANCE MONITORING SYSTEM AND METHOD THEREOF

(71) Applicant: HCL Technologies Limited, New Delhi (IN)

(72) Inventors: Ravishankar Piramanayagam, Bothell, WA (US); Meenakshi S, Chennai (IN); Sathish Gurumoorthy, Chennai (IN)

(73) Assignee: HCL Technologies Limited, New Delhi (IN)

( * ) Notice: Subject to any disclaimer, the term of this patent is extended or adjusted under 35 U.S.C. 154(b) by 255 days.

(21) Appl. No.: 17/334,708

(22) Filed: May 29, 2021

(65) Prior Publication Data

US 2022/0300986 A1    Sep. 22, 2022

(51) Int. Cl.
G06Q 50/26    (2012.01)
G06Q 50/30    (2012.01)

(52) U.S. Cl.
CPC .......... G06Q 50/265 (2013.01); G06Q 50/30 (2013.01)

(58) Field of Classification Search
CPC .............................. G06Q 50/265; G06Q 50/30
USPC ......................................................... 340/945
See application file for complete search history.

(56) References Cited

U.S. PATENT DOCUMENTS 10,881,357 B1 *   1/2021   Watson ................. A61B 5/0022
11,436,881 B2 *   9/2022   Byrappa ............... H04N 23/675

2017/0283086 A1 * 10/2017  Garing ............... B64D 45/0051
2020/0342993 A1 * 10/2020  Vandewall ............. G06Q 50/22
2021/0253255 A1 *  8/2021  Johnson ............ B60R 21/01544
2021/0371115 A1 * 12/2021  Zaman .................. B64D 45/00
(Continued)

FOREIGN PATENT DOCUMENTS

CN      101999888 B     7/2012
JP        6582252 B2    10/2019
KR     20200128473 A    11/2020

OTHER PUBLICATIONS

Michel Bieleski, "Reprint of: Air travel and COVID-19 prevention in the pandemic and peri-pandemic period: a narrative review".
(Continued)

*Primary Examiner* — Kerri L McNally

(57) ABSTRACT

An Aircraft Passenger Compliance Monitoring System (APCMS) for automating compliance monitoring for passengers onboard an aircraft is disclosed. In some embodiments, the APCMS includes an onboard server, an onboard network communicatively coupled to the onboard server, and an aircraft passenger compliance monitoring application communicatively coupled to the onboard server and the onboard network. The aircraft passenger compliance monitoring application is configured to receive passenger information related to each of a plurality of passengers. The aircraft passenger compliance monitoring application is further configured to perform a set of monitoring processes from a plurality of monitoring processes on the passenger related information received for each of the plurality of passengers. The aircraft passenger compliance monitoring application is further configured to generate a compliance measure in response to performing the set of monitoring processes.

21 Claims, 4 Drawing Sheets

(56) References Cited

U.S. PATENT DOCUMENTS

2021/0393128 A1* 12/2021 Chapman .............. A61B 5/0022
2022/0022746 A1*  1/2022 Cloete .................. A61B 5/6888

OTHER PUBLICATIONS

Diego Alonso Tabares, "An airport operations proposal for a pandemic-free air travel".
Robert T. Brigantic, "Simulation to assess the efficacy of US airport entry screening of passengers for pandemic influenza".

* cited by examiner

AIRCRAFT PASSENGER COMPLIANCE MONITORING SYSTEM AND METHOD THEREOF

TECHNICAL FIELD

Generally, the invention relates to passenger compliance monitoring systems in aircrafts. More specifically, the invention relates to an Aircraft Passenger Compliance Monitoring System (APCMS) for automating compliance monitoring for passengers onboard an aircraft.

BACKGROUND

In current pandemic COVID-19 situation, many airlines have announced new stringent enforcement of rules that requires passengers and crew members to wear masks during flights journey and maintain safe social distance from fellow passengers and/or crew members. While wearing mask ensures pathogen are not exhaled or inhaled by passengers or crew members, reasonable social distancing limit large congregations within confined cabin spaces of an aircraft, during the entire journey. In fact, the airlines have started banning passengers who refuse to cooperate with the airlines and don't follow these rules and policies. As a result, passengers violating rules and policies created by the airlines to board an aircraft, face risk of being banned by the airlines for an unspecified period of time.

Currently, onboard crew members of the aircraft are enforcing these rules and policies through a cumbersome manual process. In addition, the onboard crew members have to manually record an event of non-compliance (violations) caused by any passenger who has boarded the aircraft. Moreover, the onboard crew members need to record any non-compliance event via an existing system after every flight leg. This process of manually monitoring every passenger boarded on the aircraft is tiring and cumbersome and requires a lot of manual efforts.

Therefore, there is a need of an efficient and reliable method and system for automating compliance monitoring for passengers onboard an aircraft.

SUMMARY OF INVENTION

In one embodiment, an Aircraft Passenger Compliance Monitoring System (APCMS) for automating compliance monitoring for passengers onboard an aircraft is disclosed. The system includes an onboard server, an onboard network communicatively coupled to the onboard server, and an aircraft passenger compliance monitoring application communicatively coupled to the onboard server and the onboard network. It should be noted that, the onboard network facilitates communication of the onboard server with a sets of sub-systems associated to the aircraft. Further, the aircraft passenger compliance monitoring application is configured to receive passenger information related to each of a plurality of passengers. It should be noted that, the passenger information is captured by at least one of the sets of sub-systems. The aircraft passenger compliance monitoring application is further configured to perform a set of monitoring processes from a plurality of monitoring processes on the passenger related information received for each of the plurality of passengers. The aircraft passenger compliance monitoring application is further configured to generate a compliance measure in response to performing the set of monitoring processes.

In another embodiment, a method for automating compliance monitoring for passengers onboard an aircraft is disclosed. The method may include receiving passenger information related to each of a plurality of passengers. It should be noted that, the passenger information is captured by at least one of a sets of sub-systems. The method may further include performing a set of monitoring processes from a plurality of monitoring processes on the passenger related information received for each of the plurality of passengers. The method may further include generating a compliance measure in response to performing the set of monitoring processes.

In yet another embodiment, a non-transitory computer-readable medium storing computer-executable instruction for automating compliance monitoring for passengers onboard an aircraft is disclosed. The stored instructions, when executed by a processor, may cause the processor to perform operations including receiving passenger information related to each of a plurality of passengers. It should be noted that, the passenger information is captured by at least one of a sets of sub-systems. The stored instructions, when executed by a processor, may cause the processor to perform operations including performing a set of monitoring processes from a plurality of monitoring processes on the passenger related information received for each of the plurality of passengers. The stored instructions, when executed by a processor, may cause the processor to perform operations including generating a compliance measure in response to performing the set of monitoring processes.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
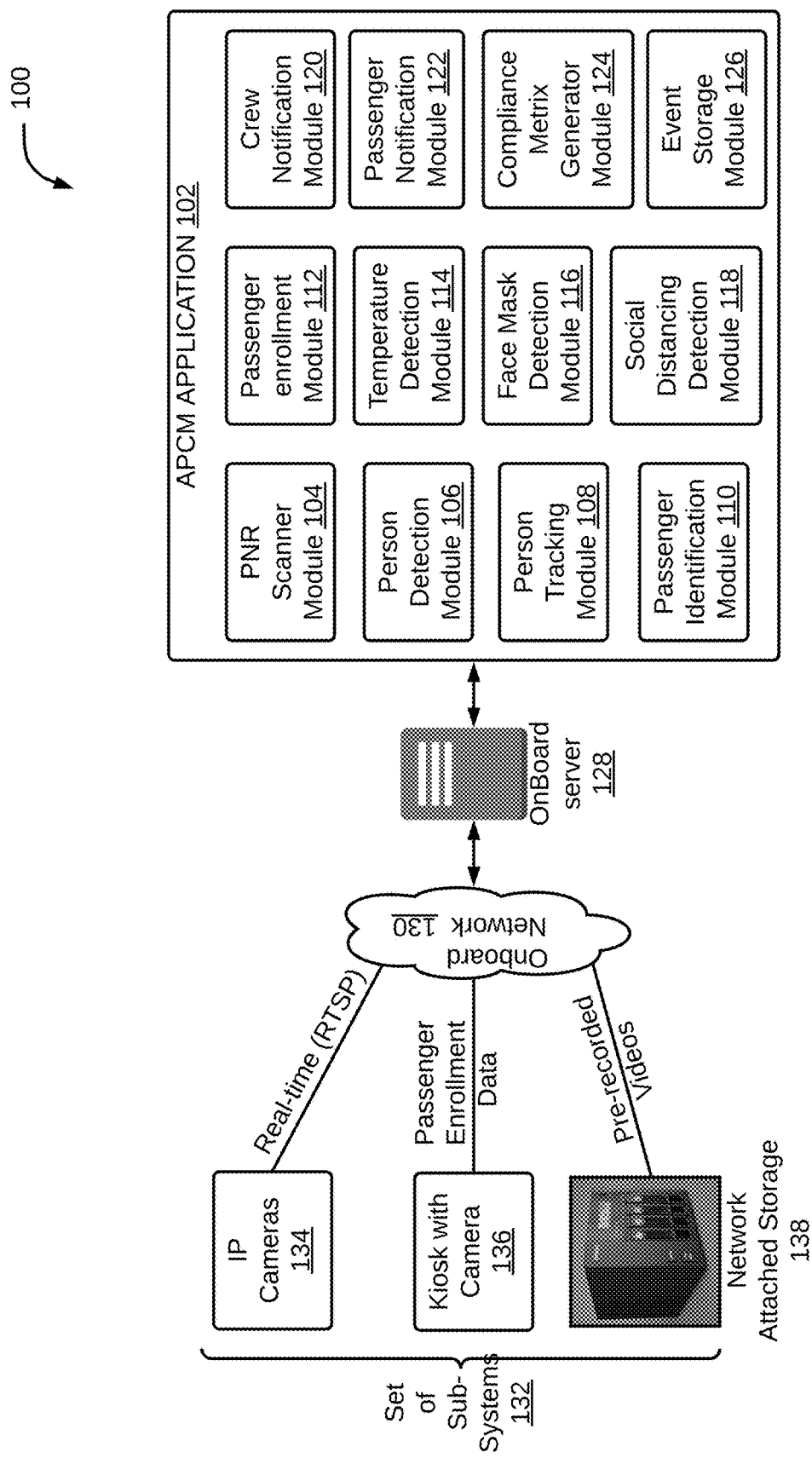
FIG. 1 illustrates a functional block diagram of an Aircraft Passenger Compliance Monitoring System (APCMS) for automating compliance monitoring for passengers onboard an aircraft, in accordance with an embodiment.

An Aircraft Passenger Compliance Monitoring System (APCMS) 100 for automating compliance monitoring for passengers onboard an aircraft, is illustrated in FIG. 1. In particular, the APCMS 100 may be configured to safely enroll each of a plurality of passengers onboard the aircraft. Thereafter, the APCMS 100 may perform compliance monitoring for each of the plurality of passengers. In order to perform compliance monitoring, the APCMS 100 may include an aircraft passenger compliance monitoring application, i.e., an APCM application 102, an onboard server 128, and an onboard network 130. In an embodiment, the APCM application 102 may be communicatively coupled to the onboard server 128 and the onboard network 130. Further, the onboard network 130 may be configured to facilitate communication of the onboard server 128 with a sets of sub-systems 132 associated with the aircraft. The onboard network 128, for example, may be any wired or wireless communication network and the examples may include, but may be not limited to, the Wired Local Area Network (LAN), Wi-Fi (IEEE 802.11).

In an embodiment, the sets of sub-systems 132 may include, but are not limited to at least one of an on-board cabin lighting system, an entertainment system of the aircraft, a passenger announcement system, a portable electronic device, a set of Internet Protocol (IP) cameras, or a network attached storage device. As will be appreciated, for ease of understanding, the sets of sub-systems 132 as depicted in present FIG. 1, include IP cameras 134, a Kiosk with cameras 136, and a network attached storage 138.

In an embodiment, the IP cameras 134 may be configured to perform real-time streaming of information associated with each of the plurality of passengers. By way of an example, the real-time streaming of information may include, but is not limited to real-time sharing of images and videos captured for each of the plurality of passengers during entire aircraft journey. In order to perform real-time streaming of information via the onboard network 130, the IP cameras 134 may utilize Real Time Streaming Protocol (RSTP).

Further, the Kiosk with cameras 136 may be configured to capture passenger information related to each of the plurality of passengers before onboard the aircraft. In an embodiment, the passenger information may also be referred as passenger enrollment data. The passenger information captured by the Kiosk with cameras 136 may be further utilized by the APCM application 102 to enroll each of the plurality of passengers. Further, the kiosk with cameras 136 may encrypt the passenger information captured based on predefined privacy and security policies. As will be appreciated, the predefined privacy and security policies of the aircraft may differ according to different airlines.

In addition, the network attached storage 138 may be configured to store recorded videos (recorded via the kiosk with cameras 136 and/or the IP cameras 134) of each of the plurality of passengers. In other words, the network attached storage 138 may be configured to store the passenger information related to each of the plurality of passengers, captured by each of the remaining sets of sub-systems. The recorded videos stored in the network attached storage 138 may be utilized by the APCM application 102 for future reference. In an embodiment, recording of the videos stored in the network attached storage 138 may be done based on batch processing.

Further, the APCM application 102 may perform a set of monitoring processes and generation of a compliance measure via a set of modules 104-126. The set of monitoring processes may include at least one of Passenger Name Record (PNR) scanning, passenger identification, passenger tracking, passenger enrolment, temperature detection, face mask detection, intrusion detection, airline guideline compliance, or social distancing detection. In addition, the compliance measure may include, but is not limited to a time-series report generated based on time-series data accumulated over a predefined time period and a live heat-map view of a cabin area within the aircraft.

The set of modules 104-126 of the APCM application 102 may correspond to a Passenger Name Record (PNR) scanner module 104, a person detection module 106, a person tracking module 108, a person identification module 110, a person enrollment module 112, a temperature detection module 114, a face mask detection module 116, a social distancing detection module 118, a crew notification module 120, a passenger notification module 122, a compliance matrix generator module 124, and an event storage module 126.

In an embodiment, in order to enroll each of the plurality of passengers, the APCM application 102 may receive the passenger information related to each of the plurality of passengers via at least one of the sets of sub-systems 132. Moreover, the at least one of the sets of sub-systems 132, utilized to send the passenger information may correspond to the Kiosk with cameras 136. It should be noted that, the APCM application 102 may receive the passenger information via the communicatively coupled onboard network 130. In addition, the APCM application 102 may run on the communicatively coupled onboard server 128.

Upon receiving the passenger information, the APCM application 102 may enroll each of the plurality of passengers based on the passenger related information via the passenger enrollment module 112. Further, the APCM application 102 may scan PNR of each of the plurality of passengers via the PNR scanner module 104. The PNR scanner module 104 may further be configured to capture a seat number of each of the plurality of passengers. In an embodiment, the PNR and seat number of each of the plurality of passengers may be captured using Red Green Blue (RGB) cameras.

Once the PNR and seat number of each of the plurality of passengers is recorded, the person detection module 106 may be configured to capture face and full-frontal image of each of the plurality of passengers onboard the aircraft. In an embodiment, the face and full-frontal image of each of the plurality of passengers may be captured using RGB cameras (via the IP cameras 134 or the kiosk with camera 136). In addition, the person detection module 106 may be configured to detect each of the plurality of passengers based on face and full-frontal image captured during at least one non-compliance event.

Further, the person tracking module 108 may be configured to track each of the plurality of passengers onboard the aircraft during their entire aircraft journey. The person tracking module 108 may track each of the plurality of passengers to identify at least one non-compliance event from a set of non-compliance events. The set of non-compliance events may include at least one absence of face mask, improper wearing of face mask, violation of social distancing norms, movement of passengers during flight take off/landing, movement of passengers during seat belt sign, passenger intrusion into unauthorized space, or passenger hostile behavior detection. In an embodiment, the person tracking module 108 may track each of the plurality of passengers via the IP cameras 134.

Moreover, based on tracking of each of the plurality of passengers, when at least one non-compliance event is identified, then the passenger identification module 110 may identify one of the plurality of passengers responsible for the at least one non-compliance event. Further, the temperature detection module 114 may be configured to detect temperature of each of the plurality of passenger while onboard the aircraft. In addition, the temperate detection module 114 may be configured to monitor temperature of each of the plurality of passengers during entire aircraft journey.

The face mask detection module 116 may be configured to detect face mask coverage of each of the plurality of passengers. By way of an example, the face mask detection module 116 may detect events like not wearing or improper wearing of face mask by at least one of the plurality of passengers. Examples of improper wearing of face mask may include not covering nose or mouth appropriately. Further, the social distancing detection module 118 may be configured to monitor distance between two or more of the plurality of passengers. In addition, the social distancing detection module 118 may be configured to detect violation of specified distance, by at least one of the plurality of passengers. As will be appreciated, the distance between two of the plurality of passengers may be specified as per airlines guidelines compliance rules.

Further, the crew notification module 120 may be configured to notify at least one non-compliance event associated with the at least one passenger to at least one of the cabin crew. In addition, the crew notification module 120 may notify the compliance measure generated in response to detection of the at least one non-compliance event to one of the cabin crew. In an embodiment, the compliance measure includes the time-series report generated based on time-series data accumulated over the predefined time period. Moreover, the time-series report generated may further include compliance scores across the plurality of zones within the aircraft at predefined time intervals.

The passenger notification module 122 may be configured to notify about the at least one non-compliance event to one of the plurality of passengers responsible for the at least one non-compliance event. By way of an example, the passenger notification module 122 may notify one of the plurality of passengers to properly wear face mask or to maintain the specified distance.

Further, the compliance matrix generator module 124 may be configured to generate a live heat-map view of the cabin area within the aircraft. In an embodiment, the live heat-map may correspond to social distancing compliance metrics. It should be noted that, the heat map may correspond to two-dimensional representation of data in which values are represented by colors. Moreover, the live heat-map generated may be rendered to each of the plurality of passengers, one of the cabin crew, and each of the sets of airline operation crew via one of the sets of sub-systems 132. In an embodiment, the live-heat map generated may be rendered in order to promote self-regulation for each of the plurality of passengers, one of the cabin crew, and each of the sets of airline operation crew.

The event storage module 126 may be configured to store each of the set of non-compliance events associated with the plurality of passengers. Further, the set of non-compliance events stored in the event storage module 126 may be used by each of the sets of airline operation crew for future reference. By way of an example, the sets of airline operation crew may decide whether to ban particular passenger from future boarding of the aircraft, based on data store in the event storage module 126.

In addition, the APCM application 102 may contain intelligence for suppressing false positive alerts. The false positive alerts may correspond to notifications generated in response to detection of the at least one non-compliance event that may not be accurate. By way of an example, the APCM application 102 may suppress alerts generated for the at least one non-compliance event associated with kids below 2 years, infants, and/or specific passengers with pre-approved medical exceptions. By way of another example, the APCM application 102 may suppress alerts generated for the at least one non-compliance event associated with each of the plurality of passengers during intake of food or drinks. In addition, the APCM application 102 may allow dynamic adjustment for Artificial Intelligence (AI) model sensitivity. In other words, the APCM application 102 may support field calibration to dynamically adjust AI model when any issue is encountered. Further, the APCM application 102 may provide field of view adjustments in order to restrict detection of the set of non-compliance events in certain area of image captured.

In particular, as will be appreciated by those of ordinary skill in the art, various modules 104-126 of the APCM application 102 used for performing the techniques and steps described herein may be implemented in the APCMS 100, either by hardware, software, or combinations of hardware and software. For example, suitable code may be accessed and executed by the one or more processors on the APCMS 1020 to perform some or all of the techniques described herein. Similarly, application specific integrated circuits (ASICs) configured to perform some, or all of the processes described herein may be included in the one or more processors on the host computing system. As will be appreciated, the APCM application 102 disclosed in the present FIG. 1, may be implemented in any computing devices.

Moreover, the APCMS 100 disclosed in present FIG. 1 may provide an end-to-end automated solution to avoid manual tasks of monitoring and recording of at least one non-compliance associated with one or more of the plurality passengers. In addition, the APCMS 100 may automatically capture and record any onboard violation, i.e., the at least one non-compliance event, with requirement of very minimal inputs from one of cabin crew. Further, the APCMS 100 disclosed may autonomously process the passenger information captured via the sets of sub-systems 132. By way of an example, in order to autonomously process the passenger information received in form of videos, the APCMS 100 may add markers for each of the set of non-compliance event in videos for easy identification and recording of one or more of the set of non-compliance events. Moreover, the APCMS 100 may provide an intelligent fault suppression logic in order to prevents false alerts of one of the set of non-compliance events associated with at least one of the plurality of passengers.

Figure 2:
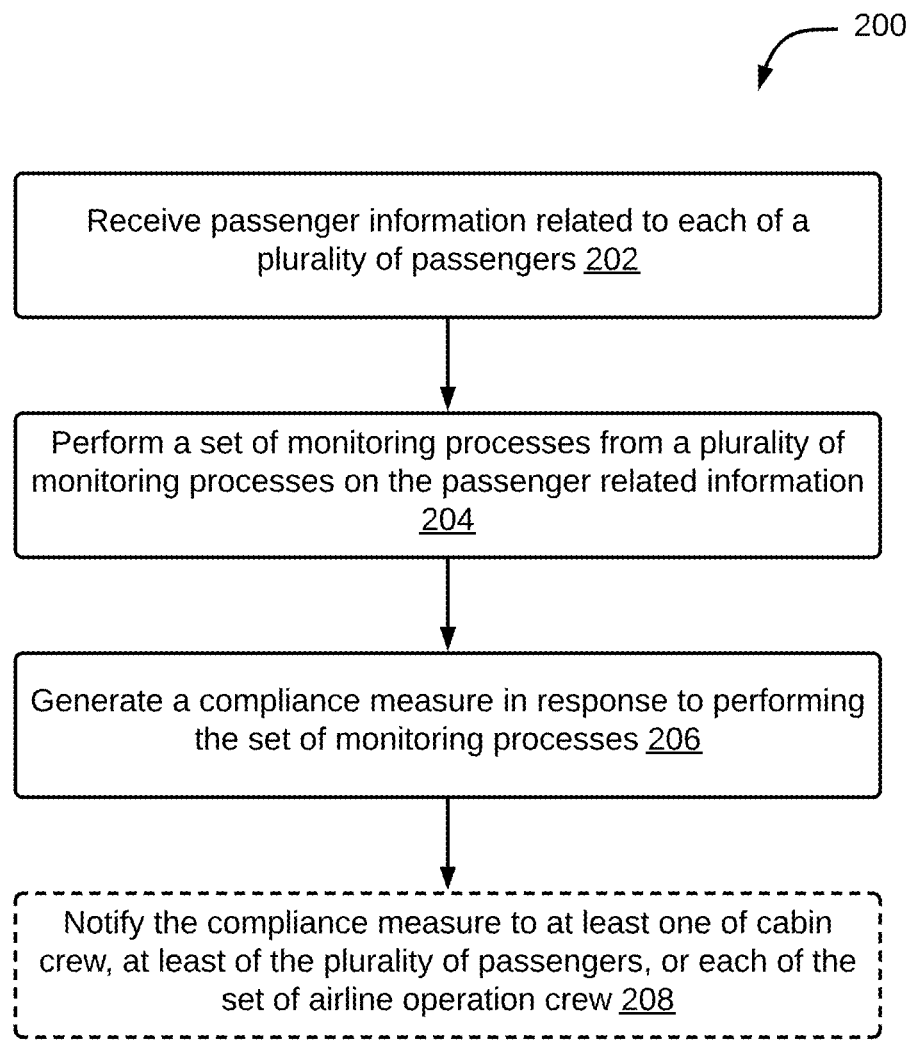
FIG. 2 illustrates a flowchart of a method for automating compliance monitoring for passengers onboard an aircraft, in accordance with an embodiment.

Referring now to FIG. 2 a flowchart of a method for automating compliance monitoring for passengers onboard an aircraft is illustrated, in accordance with an embodiment. At step 202, passenger information may be received. The passenger information received may be related to each of a plurality of passengers onboard the aircraft. In reference to FIG. 1, the passenger information may be captured by at least one of the sets of sub-systems 132. In an embodiment, the passenger information may include a sets of passenger parameters associated with each of the plurality of passengers. In addition, the sets of passenger parameters may include, but is not limited to, body temperature, face and full-frontal image, PNR, seat number, and heart rate. In an embodiment, each of the sets of passenger parameters received may be utilized to enroll each of the plurality of passengers boarding the aircraft. A method of receiving the passenger related information is explained in greater detail in conjunction with FIG. 3.

Once each of the plurality of passengers are enrolled based on the passenger related information received, at step 204, a set of monitoring processes from a plurality of monitoring processes may be performed. The set of monitoring processes may be performed on the passenger related information received for each of the plurality of passengers. In an embodiment, the plurality of monitoring processes comprises at least one of PNR scanning, passenger identification, passenger tracking, passenger enrolment, temperature detection, face mask detection, intrusion detection, airline guideline compliance, or social distancing detection. Examples of airline guidelines compliance monitoring process may include monitoring of passenger movement during seat belt sign, monitoring of secured areas in cabins of the aircraft, and monitoring of minor passengers.

By way of an example, movement of each of the plurality of passengers may be monitored when the seat belt sign is on. In other words, a check may be performed to identify whether each of the plurality of passengers have put-in their seat belts during take-off and landing of the aircraft, or when it is instructed to do so. A method of performing the set of monitoring processes has been explained in greater detail in conjunction with FIG.4. In an embodiment, the set of monitoring processes may be performed in order to identify at least one non-compliance event from a set of non-compliance events. The at least one non-compliance event identified may be associated with one of the plurality of passengers.

Further, based on the set of monitoring processes performed, at step 206, a compliance measure may be generated. In an embodiment, the compliance measure may include the at least one non-compliance event. The set of non-compliance event may include at least one absence of face mask, improper wearing of face mask, violation of social distancing norms, movement of passengers during flight take off/landing, or movement of passengers during seat belt sign, passenger intrusion into unauthorized space, or passenger hostile behavior detection. A method of generating the compliance measure is explained in greater detail in conjunction with FIG. 5.

Moreover, the compliance measure may include a time-series report generated based on time-series data accumulated over a predefined time period. The time-series report may further include compliance scores accumulated across a plurality of zones within the aircraft at predefined time intervals. In an embodiment, the time-series report generated may allow airlines (to which the aircraft belongs) to take informed decision for making operational changes. The operational changes may be associated with onboarding, seating, and de-boarding procedures of the aircraft.

In addition, the compliance measure may include a live heat-map view of a cabin area within the aircraft. The live heat-map may correspond to social distancing compliance metrics. Further, the live heat-map view generated may be rendered to at least one of cabin crew, at least one of the plurality of passengers, or each of the sets of airline operation crew. In an embodiment, the live heat-map view generated may promote self-regulation for each of the plurality of passengers and each of the cabin crew. Once the compliance measure is generated, at step 208, the compliance measure generated may be notified to at least one of cabin crew, at least one of the plurality of passengers, or each of the sets of airline operation crew. In an embodiment, the compliance measure may be notified to at least one of cabin crew, at least one of the plurality of passengers, or each of the sets of airline operation crew via at least one of the sets of sub-systems. The sets of sub-systems may include at least one of an on-board cabin lighting system, an entertainment system of the aircraft, a passenger announcement system, a portable electronic device, a set of IP cameras, or a network attached storage device. In reference to FIG. 1, the sets of sub-systems may correspond to the sets of sub-systems 132.

By way of an example, the at least one non-compliance event may be notified via the on-board cabin lighting system by activating overhead call-light of one of the plurality of passengers. The one of the plurality of passengers may correspond to a passenger responsible for causing the at least one non-compliance event. Consider a scenario, suppose a passenger from the plurality of passengers has not been wearing his mask from past 15 minutes. Then, based on the set of monitoring processes performed, a deviation may be monitored in one or more of the sets of passenger parameters associated with the passenger. The deviation may be identified based on the associated predefined deviation threshold. Based on the deviation monitored, at least one non-compliance event may be identified. In current scenario, the at least one non-compliance event may correspond to not wearing of face mask.

Upon identifying the at least one non-compliance event, a compliance measure may be generated. The compliance measure may correspond to activation of the overhead call-light of that passenger. The overhead call-light may be activated in order to notify at least one of cabin crew, at least one of the plurality of passengers, or each of the sets of airline operation crew about the at least one non-compliance event. Based on the notification, the at least one of cabin crew, at least one of the plurality of passengers, or each of the sets of airline operation crew may take a suitable precautionary measure.

By way of another example, the at least one non-compliance event may be notified as aural or textual notification to at least one of cabin crew, at least one of the plurality of passengers, or each of the sets of airline operation crew. In order to notify the at least one non-compliance event in aural or textual notification, the entertainment system of the aircraft, or passenger announcement system may be utilized. In an embodiment, the entertainment system of the aircraft may also be referred as In-Flight Entertainment System (FES). In addition, event alerts for the at least one non-compliance event may be provided to at least one of cabin crew, at least one of the plurality of passengers, or each of the sets of airline operation crew via the portable electronic device.

Figure 3:
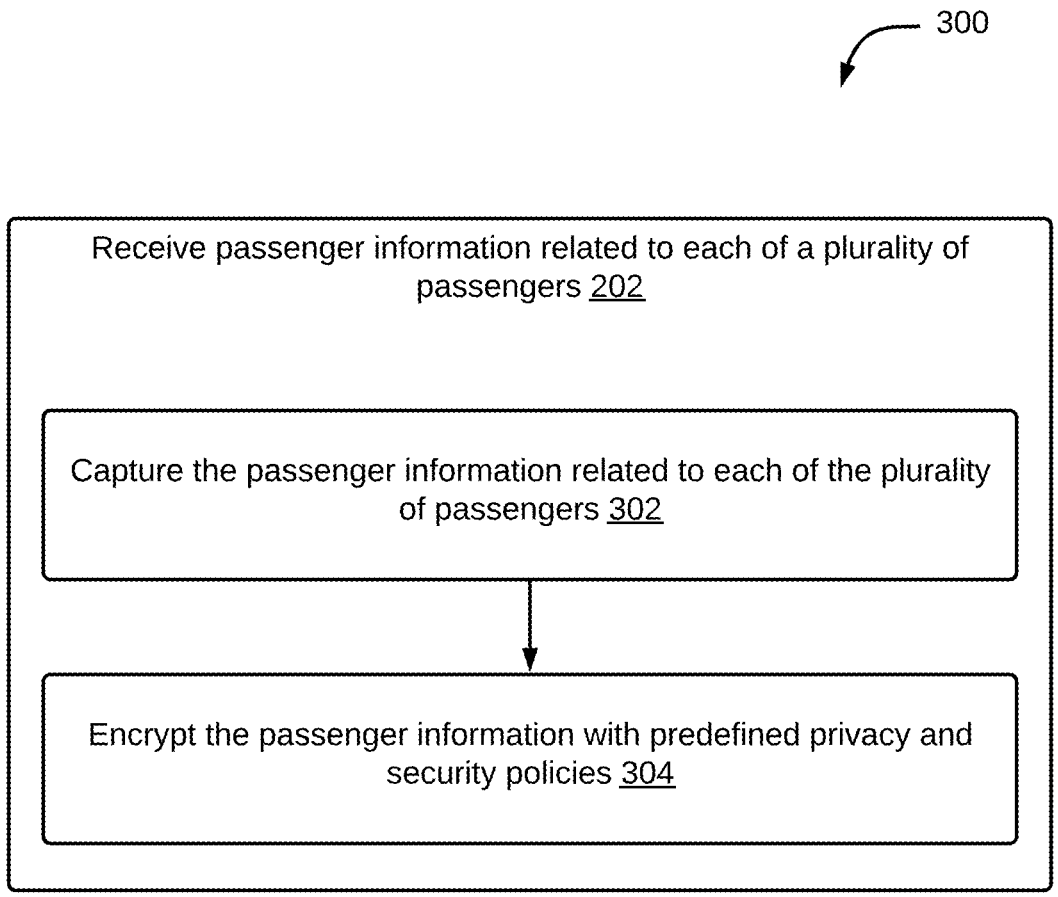
FIG. 3 illustrates a flowchart of a method for receiving passenger information, in accordance with an embodiment.

Referring now to FIG. 3, a flowchart of a method for receiving passenger information is illustrated, in accordance with an embodiment. In reference to FIG. 2, in order to receive the passenger information as mentioned in step 202, at step 302, initially, the passenger information may be captured. The passenger information captured may be related to each of the plurality of passengers. In an embodiment, the passenger information may include a sets of passenger parameters associated with each of the plurality of passengers. Further, the sets of passenger parameters may include, but is not limited to, body temperature, face and full-frontal image, PNR, seat number, and heart rate.

Once the passenger information corresponding to each of the plurality of passengers is captured, at step 304, the captured passenger information may be encrypted. In an embodiment, the passenger information may be encrypted with predefined privacy and security policies. As will be appreciated, the passenger information associated with each of the plurality of passengers may be encrypted to maintain privacy of each of the plurality of passengers. In other words, the passenger information associated with each of the plurality of passengers may be encrypted to avoid its misuse.

By way of an example, real-time information (e.g., images and videos) captured for each of the plurality of passengers may be encrypted. In addition, the real-time information captured may be made accessible to only authorized crew members of the aircraft. The authorized crew members may correspond to one or more of the cabin crews and one or more of the sets of airline operation crew. Further, the passenger information may be encrypted in order to avoid misuse of any private passenger information. In reference to FIG. 1, the passenger information may be captured via at least one of the sets of sub-systems 132. In particular, the passenger information associated with each of the plurality of passengers may be captured and encrypted via the Kiosk with cameras 136.

Figure 4:
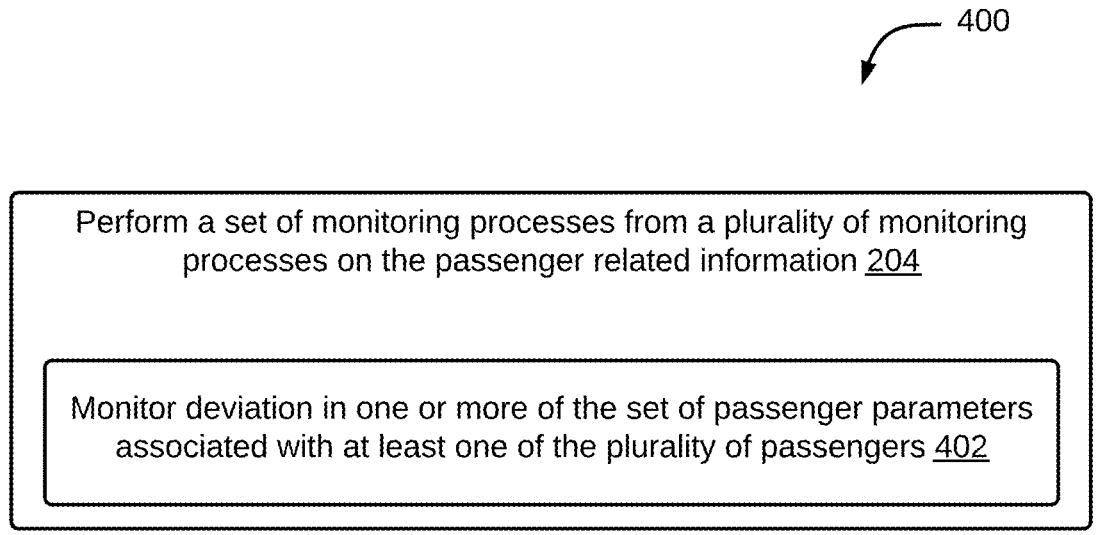
FIG. 4 illustrates a flowchart of a method for performing a set of monitoring process on the passenger related information, in accordance with an embodiment.

Referring to FIG. 4, a flowchart of a method for performing a set of monitoring process on the passenger related information is illustrated, in accordance with an embodiment. In reference to FIG. 2, in order to perform the set of monitoring processes as mentioned in step 204, at step 402, deviation in one or more of the sets of passenger parameters may be monitored. The sets of passenger parameters may be associated with at least one of the plurality of passengers. In an embodiment, the sets of passenger parameters may include, but is not limited to, body temperature, face and full-frontal image, PNR, seat number, and heart rate. Further, the deviation in one or more of the sets of passenger parameters may be monitored based on an associated predefined deviation threshold. As should be noted that, the predefined deviation threshold may vary for different airlines based on airlines guidelines compliance of different airlines.

By way of an example, suppose the associated predefined deviation threshold for first passenger parameter, i.e., body temperature, from the sets of passenger parameter may be defined to be 98 degree Celsius. Then, based on the associated predefined deviation threshold defined for the first passenger parameter, each of the plurality of passengers may be monitored corresponding to the first passenger parameter. Further, in response to monitoring of each of the plurality of passengers corresponding to the first passenger parameter, any deviation in first passenger parameter associated with one of the plurality of passengers may be identified. Upon identifying the deviation associated with one of the plurality of passengers, the compliance measure may be generated. A process of generating a compliance measure has been explained in greater detail in conjunction with FIG. 5.

Figure 5:
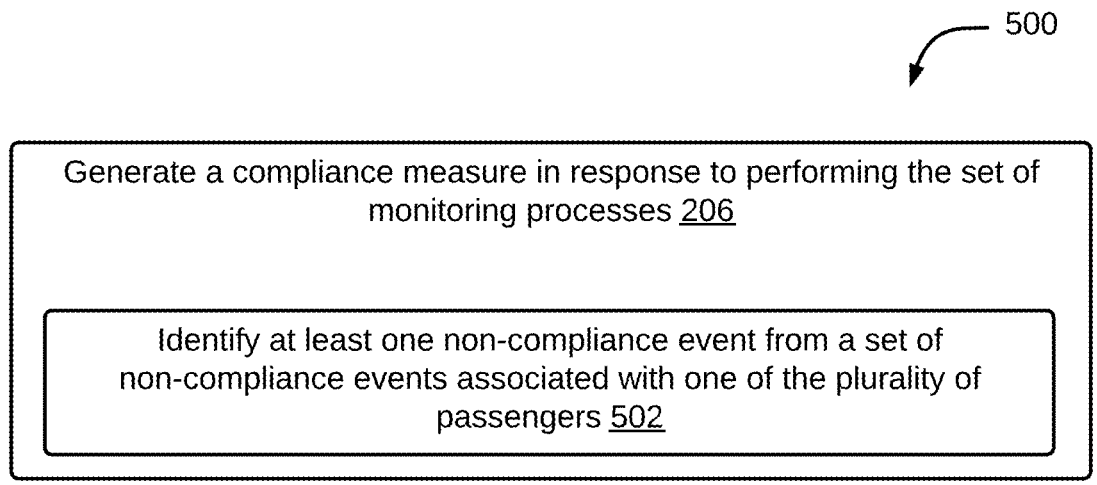
FIG. 5 illustrates a flowchart of a method for generating a compliance measure, in accordance with an embodiment.

Referring now to FIG. 5, a flowchart of a method for generating a compliance measure is illustrated, in accordance with an embodiment. In reference to FIG. 2, in order to generate the compliance measure as mentioned in step 206, at step 502, at least one non-compliance event from the set of non-compliance events may be identified. In reference to FIG. 4, the at least one non-compliance event may be identified based on the set of monitoring processes performed. The at least one non-compliance event identified may be associated with one of the plurality of passengers. In an embodiment, the set of non-compliance event may include at least one absence of face mask, improper wearing of face mask, violation of social distancing norms, movement of passengers during flight take off/landing, or movement of passengers during seat belt sign, passenger intrusion into unauthorized space, or passenger hostile behavior detection.

By way of an example, based on the set of monitoring processes performed any deviation in one or more of the sets of passenger parameters may be monitored. Upon detecting deviation in one of the sets of passenger parameters, the at least one non-compliance event may be encountered. Further, based on the at least one non-compliance event encountered, the compliance measure may be generated. Once the compliance measure is generated, the generated compliance measure may be notified to at least one of cabin crew, at least one of the plurality of passengers, or each of the sets of airline operation crew. Further, upon receiving the notification of compliance measure, the at least one of the cabin crew may take appropriate actions. For example, upon identifying deviation in body temperature of one of the plurality of passengers while boarding the aircraft, the compliance measure may be generated. Further, the generated compliance measure may be notified to one of the cabin crew. Upon receiving the notification of the compliance measure, the one of the cabin crew may not allow that passenger to board the aircraft.

Various embodiments provide method and system for automating compliance monitoring for passengers onboard an aircraft. The disclosed method and system may receive passenger information related to each of a plurality of passengers. The passenger information may be captured by at least one of a sets of sub-systems. Further, the disclosed method and system may perform a set of monitoring processes from a plurality of monitoring processes on the passenger related information received for each of the plurality of passengers. Thereafter, the disclosed method and system may generate a compliance measure in response to performing the set of monitoring processes.

The system and method provide some advantages like, the system and the method may enable airlines to roll-out a self-contained, autonomous passenger compliance monitoring solution for variety of non-compliance event like, elevated temperature, face mask, social distancing, etc., without any due dependence on underlying airport infrastructure. Further, the system and the method disclosed may add less than 31*bs* weight to aircrafts in order to accommodate a kiosk for elevated temperature detection and passenger enrollment. Moreover, the disclosed system and the method may use fine-tuned video processing pipeline. The fine-tune video processing pipeline may allow videos to run on a constrained onboard server, via an integrated Graphical Processing Unit (iGPU) processor. Examples of some similar techniques that may easily run on the constrained onboard server includes batch normalization of stacked frames received from multiple IP cameras, hardware assisted frame encoding and decoding, light-weight machine learning models, and graceful handling of obfuscation and occlusion scenarios. Further, the disclosed system and the method may significantly reduce workload of cabin crew by autonomously verifying airline guideline compliance and in return generating timely alerts for early intervention. In addition, the disclosed system may be developed as Plug-and-Play architecture in order to allow easy integration with other aircraft cabin systems. The Plug-and-Play architecture utilized may provide a seamless interface to delivery visual, aural, and textual notifications. This in turn may bring increased situational awareness to both passengers and cabin crew of the aircraft.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. An Aircraft Passenger Compliance Monitoring System (APCMS) for automating compliance monitoring for passengers onboard an aircraft, the APCMS comprising:
    an onboard server;
    an onboard network communicatively coupled to the onboard server, wherein the onboard network facilitates communication of the onboard server with a set of sub-systems associated to the aircraft; and
    an aircraft passenger compliance monitoring application communicatively coupled to the onboard server and the onboard network, wherein the aircraft passenger compliance monitoring application is configured to:
        receive passenger information related to each of a plurality of passengers, wherein the passenger information is captured by at least one of the sets of sub-systems;
        perform a set of monitoring processes from a plurality of monitoring processes on the passenger related information received for each of the plurality of passengers; and
        generate a compliance measure in response to performing the set of monitoring processes, wherein the compliance measure comprises a time-series report generated based on time-series data accumulated over a predefined time period, and wherein the time-series report further comprises compliance scores across a plurality of zones within the aircraft at predefined time intervals.

2. The APCMS of claim 1, wherein the plurality of monitoring processes comprises at least one of Passenger Name Record (PNR) scanning, passenger identification, passenger tracking, passenger enrollment, temperature detection, face mask detection, intrusion detection, airline guideline compliance, or social distancing detection.

3. The APCMS of claim 1, wherein the sets of sub-systems comprises at least one of an on-board cabin lighting system, an entertainment system of the aircraft, a passenger announcement system, a portable electronic device, a set of Internet Protocol (IP) cameras, or a network attached storage device.

4. The APCMS of claim 3, wherein the network attached storage device is configured to store the passenger information related to each of the plurality of passengers' information, captured by each of the remaining sets of sub-systems.

5. The APCMS of claim 1, wherein the sets of sub-systems is configured to:
    capture the passenger information related to each of the plurality of passengers; and
    encrypt the passenger information with predefined privacy and security policies.

6. The APCMS of claim 1, wherein the passenger information comprises a set of passenger parameters associated with each of the plurality of passengers, wherein the sets of passenger parameters comprises body temperature, face and full-frontal image, Passenger Name Record (PNR), seat number, and heart rate.

7. The APCMS of claim 6, wherein to perform the set of monitoring processes, the aircraft passenger compliance monitoring application is further configured to monitor deviation in one or more of the sets of passenger parameters associated with at least one of the plurality of passengers with respect to an associated predefined deviation threshold.

8. The APCMS of claim 7, wherein to generate the compliance measure in response to performing the set of monitoring processes, the aircraft passenger compliance monitoring application is configured to identify at least one non-compliance event from a set of non-compliance events associated with one of the plurality of passengers, wherein the compliance measure comprises the at least one non-compliance event, and wherein the set of non-compliance events comprises at least one absence of face mask, improper wearing of face mask, violation of social distancing norms, movement of passengers during flight take off/ landing, movement of passengers during seat belt sign, passenger intrusion into unauthorized space, or passenger hostile behavior detection.

9. The APCMS of claim 1, wherein the aircraft passenger compliance monitoring application is configured to notify, via at least one of the sets of sub-systems, the compliance measure to at least one of cabin crew, at least one of the plurality of passengers, or each of the sets of airline operation crew.

10. The APCMS of claim 1, wherein the compliance measure comprises a live heat-map view of a cabin area within the aircraft, wherein the live heat-map corresponds to social distancing compliance metrics, and wherein the aircraft passenger compliance monitoring application is configured to render the live heat-map via one of the sets of sub-systems.

11. A method for automating compliance monitoring for passengers onboard an aircraft, the method comprising:
receiving, by an Aircraft Passenger Compliance Monitoring System (APCMS), passenger information related to each of a plurality of passengers, wherein the passenger information is captured by at least one of a set of sub-systems;
performing, by the APCMS, a set of monitoring processes from a plurality of monitoring processes on the passenger related information received for each of the plurality of passengers; and
generating, by the APCMS, a compliance measure in response to performing the set of monitoring processes, wherein the compliance measure comprises a time-series report generated based on time-series data accumulated over a predefined time period, and wherein the time-series report further comprises compliance scores across a plurality of zones within the aircraft at predefined time intervals.

12. The method of claim 11, wherein the plurality of monitoring processes comprises at least one of Passenger Name Record (PNR) scanning, passenger identification, passenger tracking, passenger enrollment, temperature detection, face mask detection, intrusion detection, airline guideline compliance, or social distancing detection.

13. The method of claim 11, wherein the sets of sub-systems comprises at least one of an on-board cabin lighting system, an entertainment system of the aircraft, a passenger announcement system, a portable electronic device, a set of Internet Protocol (IP) cameras, or a network attached storage device.

14. The method of claim 13, wherein the network attached storage device is configured to store the passenger information related to each of the plurality of passenger's information, captured by each of the remaining sets of sub-systems.

15. The method of claim 11, wherein receiving the passenger information related to each of the plurality of passengers comprises:
capturing, by at least one of the sets of sub-systems, the passenger information related to each of the plurality of passengers; and
encrypting, by at least one of the sets of sub-systems, the passenger information with predefined privacy and security policies.

16. The method of claim 11, wherein the passenger information comprises a set of passenger parameters associated with each of the plurality of passengers, wherein the sets of passenger parameters comprises body temperature, face and full-frontal image, Passenger Name Record (PNR), seat number, and heart rate.

17. The method of claim 16, wherein performing the set of monitoring processes comprises monitoring deviation in one or more of the sets of passenger parameters associated with at least one of the plurality of passengers with respect to an associated predefined deviation threshold.

18. The method of claim 17, wherein generating the compliance measure in response to performing the set of monitoring processes comprises identifying at least one non-compliance event from a set of non-compliance events associated with one of the plurality of passengers, wherein the compliance measure comprises the at least one non-compliance event, and wherein the set of non-compliance events comprises at least one absence of face mask, improper wearing of face mask, violation of social distancing norms, movement of passengers during flight take off/landing, movement of passengers during seat belt sign, passenger intrusion into unauthorized space, or passenger hostile behavior detection.

19. The method of claim 11, further comprises notifying, via at least one of the sets of sub-systems, the compliance measure to at least one of cabin crew, at least one of the plurality of passengers, or each of sets of airline operation crew.

20. The method of claim 11, wherein the compliance measure comprises a live heat-map view of a cabin area within the aircraft, wherein the live heat-map corresponds to social distancing compliance metrics, and wherein the aircraft passenger compliance monitoring application is configured to render the live heat-map via one of the sets of sub-systems.

21. A non-transitory computer-readable medium storing computer-executable instructions for automating compliance monitoring for passengers onboard an aircraft, the stored instructions, when executed by a processor, cause the processor to perform operations comprising:
receiving passenger information related to each of a plurality of passengers, wherein the passenger information is captured by at least one of a set of sub-systems;
performing a set of monitoring processes from a plurality of monitoring processes on the passenger related information received for each of the plurality of passengers; and
generating a compliance measure in response to performing the set of monitoring processes, wherein the compliance measure comprises a time-series report generated based on time-series data accumulated over a predefined time period, and wherein the time-series report further comprises compliance scores across a plurality of zones within the aircraft at predefined time intervals.

* * * * *